3,813,358
POLYCARBONATE MOLDING COMPOSITION COMPRISING AN AROMATIC POLYCARBONATE GRAFT COPOLYMER AND A MODIFIER
William J. O'Connell, Evansville, Ind., assignor to General Electric Company
No Drawing. Filed Jan. 3, 1972, Ser. No. 215,111
Int. Cl. C08b 21/08; C08g 41/04, 39/10
U.S. Cl. 260—16                    4 Claims

ABSTRACT OF THE DISCLOSURE

An improved polycarbonate molding composition having in admixture therewith minor amounts of a graft copolymer of a polybutadiene and a mixture of an alkenyl cyanide and a vinyl aromatic hydrocarbon.

This invention is directed to an improved aromatic polycarbonate molding composition wherein the improvement consists of adding to the composition a particular graft copolymer.

BACKGROUND OF THE INVENTION

Polycarbonate resins of the aromatic type generally suffer from environmental stress crazing and cracking and present a serious deficiency to aromatic polycarbonates. As set forth in U.S. Pat. 3,431,224, the incorporation of minor amounts of a modifier and in particular a polyolefin such as polyethylene greatly reduced stress crazing and cracking of molded articles of polycarbonate resins.

Unfortunately, it has now been uncovered that during continuous molding of the polycarbonate/polyolefin composition, deposits formed on the inside surface of the mold area which deposits then caused objectionable surface defects in the molded article. This affects the appearance of the molded article and involves a high rejection rate. In addition, severe down time can result since the mold generally has to be resurfaced to remove the deposits.

DESCRIPTION OF THE INVENTION

It has now been surprisingly discovered that by adding minor amounts of a particular material to a modified polycarbonate composition, the deposits on the mold surface are eliminated. The modified polycarbonate composition employed herein is completely disclosed in U.S. Pat. 3,431,224, which patent is incorporated herein by reference. Specifically, the modified polycarbonate composition is one which consists of a polycarbonate in admixture with at least one member of the class consisting of polyethylene, polypropylene, polyisobutylene, a copolymer of ethylene and an alkyl acrylate, a copolymer of ethylene and propylene, a cellulose ester, a polyamide, a polyvinyl acetal, an alkyl cellulose ether, and a polyurethane elastomer. The amount of modifier employed as set forth in U.S. Pat. 3,431,224 is 0.25 to about 50% by weight based on the weight of the polycarbonate and modifier.

A full description of the polycarbonate and process for making same are disclosed in the above identified patent which is incorporated herein by reference. The preferred polycarbonate is one prepared by reacting 2,2 bis(4-hydroxyphenyl) propane with phosgene to produce a polymer having a structural formula of essentially repeating units as follows:

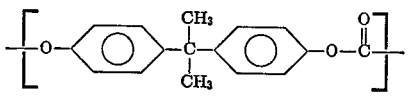

A preferred process for preparing the carbonate polymer suitable for use herein involves the use of a carbonyl halide such as phosgene. The method involves passing phosgene gas into a reaction mixture containing the dihydric phenol and an acid acceptor. The acid acceptor may be used undiluted or diluted with inert organic solvents. The temperature at which the reaction may proceed may vary from below 0° C. to above 100° C. Other processes for carrying out the reaction and further details of the conditions therein are complete described in U.S. Pat. 3,431,224.

This invention is directed to an improved polycarbonate composition having in admixture with the modified polycarbonate minor amounts of a particular graft copolymer. More particularly, the minor amounts employed herein are in the range of 0.01 to about 2.0 weight percent based on the weight of the total polymer composition. The graft copolymer of this invention is a graft copolymer of polybutadiene and a mixture of an alkenyl cyanide and a vinyl aromatic hydrocarbon. More particularly, it is a graft copolymer of polybutadiene and a mixture of acrylonitrile and styrene. Generally the reaction mixture is 60 to 10 weight percent polybutadiene and correspondingly 40-90 weight percent combined acrylonitrile and styrene all based on the weight of reaction mixture to prepare the graft copolymer. The acrylonitrile preferably comprises from 5-30 weight percent, the styrene 30-80 weight percent and the polybutadiene, correspondingly, 10-60 weight percent of polybutadiene.

The graft copolymer is prepared by "graft copolymerization" which is a process wherein a polymerization monomer is reacted under polymerizing conditions, in the presence of a previously formed polymer as copolymer. A graft copolymer may also be produced, for example by polymerization of a given kind of monomer with subsequent polymerization of another kind of monomer onto the product of the first polymerization. As stated previously, the graft copolymer of this invention may be prepared by the copolymerization of a mixture of an alkenyl cyanide and a vinyl aromatic hydrocarbon such as acrylonitrile and styrene with polybutadiene.

DESCRIPTION OF THE PREFERRED EMBODIMENT

The examples set forth herein are to illustrate in more detail the preferred embodiment and to illustrate more clearly the principle and practice of this invention to those skilled in the art. Where percentages or parts are mentioned, they are on a weight basis.

EXAMPLE I

A blend of 96 parts of polycarbonate and 4 parts of polyethylene as described in U.S. Pat. 3,431,224 is continually injection molded for a trial period of 12 hours. Mold samples are 4" x 2" x ½" thick. After 4 hours, deposits appeared on the inside surface of the mold and molded parts began to show surface imperfections. During the remaining 8 hours of the 12-hour test, the deposits became larger in size and the surface imperfections of the molded shapes more pronounced.

EXAMPLE II

To the blend employed in Example I above, add 2 weight percent of a graft copolymer containing 30 weight percent of polybutadiene, 25 weight percent acrylonitrile and 45 weight percent of styrene. The composition is injection molded for a trial period of 12 hours under the same molding conditions employed in Example I. During the entire 12 hour period, no deposits were visible or noticeable and the molded parts had no surface imperfections.

As shown in the examples, the mere addition of the graft copolymer as described previously completely eliminates deposits in the inner surface of the mold allowing for ease of molding.

It is not fully understood how the graft copolymer described above works since other materials either did not produce the desired results or adversely affected the properties of the polycarbonate/polyolefin composition. Such additives tried were ethylene vinyl acetate, polycaprolactone, polystyrene and high impact polystyrene.

It will thus be seen that the objects set forth above among those made apparent from the preceding description are efficiently attained and since certain changes may be made in carrying out the above process and in the composition set forth without departing from the scope of this invention, it is intended that all matters contained in the above description shall be interpreted as illustrative and not in a limiting sense.

What is claimed is:

1. An improved polycarbonate molding composition consisting of an admixture of an aromatic polycarbonate and a modifier, said modifier being present in an amount of from about 0.25 to about 50 weight percent based on the weight of the polycarbonate and modifier and the improvement consisting of having in admixture therewith from about 0.01 to about 2.0 weight percent based on the total weight of the polycarbonate composition of a graft copolymer of polybutadiene and a mixture of an alkenyl cyanide and a vinyl aromatic hydrocarbon; said modifier being selected from the group consisting of polyethylene, polypropylene, polyisobutylene, a copolymer of ethylene and an alkyl acrylate, a copolymer of ethylene and propylene, a cellulose ester, a polyamide, a polyvinyl acetal, an alkyl cellulose ether and a polyurethane elastomer; said aromatic polycarbonate being the reaction product of a dihydric phenol and a carbonate precursor.

2. The composition of claim 1 wherein the graft copolymer is a graft copolymer of polybutadiene and a mixture of carylonitrile and styrene.

3. The composition of claim 1 wherein the graft copolymer is a graft copolymer of 60–10 weight percent of polybutadiene and correspondingly, 40–90 weight percent combined of acrylonitrile and styrene based on the weight of the graft copolymer.

4. The composition of claim 1 wherein the polycarbonate is the reaction product of 2,2-bis(4-hydroxyphenyl) propane and phosgene.

References Cited

UNITED STATES PATENTS

| | | | |
|---|---|---|---|
| 3,431,224 | 3/1969 | Goldblum | 260—13 |
| 3,110,177 | 4/1964 | Grabowski | 260—873 |
| 3,642,946 | 2/1972 | Grabowski | 260—873 |

WILLIAM H. SHORT, Primary Examiner

E. WOODBERRY, Assistant Examiner

U.S. Cl. X.R.

260—857, 858, 859, 873